(12) United States Patent
Tsuei et al.

(10) Patent No.: US 10,619,853 B2
(45) Date of Patent: Apr. 14, 2020

(54) MICRO TURBINE GENERATOR WITH GUIDE VANE STRUCTURE

(71) Applicant: NATIONAL CHUNG SHAN INSTITUTE OF SCIENCE AND TECHNOLOGY, Taoyuan (TW)

(72) Inventors: Yung-Mao Tsuei, Taichung (TW); Chih-Chuan Lee, Taichung (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 341 days.

(21) Appl. No.: 15/385,041

(22) Filed: Dec. 20, 2016

(65) Prior Publication Data

US 2018/0172270 A1 Jun. 21, 2018

(51) Int. Cl.
*F23R 3/02* (2006.01)
*F02C 3/14* (2006.01)
*H02K 7/18* (2006.01)
*F02C 7/141* (2006.01)

(52) U.S. Cl.
CPC ............... *F23R 3/02* (2013.01); *F02C 3/145* (2013.01); *F02C 7/141* (2013.01); *H02K 7/1823* (2013.01); *F23C 2900/03001* (2013.01); *Y02T 50/675* (2013.01)

(58) Field of Classification Search
CPC .... F23R 3/02; F23R 3/26; F02C 3/145; F02C 7/141; F02C 7/08; F02C 7/10; F02C 7/105; F23C 2900/03001; F04D 29/54; F04D 29/544; F04D 29/547
See application file for complete search history.

(56) References Cited

U.S. PATENT DOCUMENTS

| 8,387,357 | B2* | 3/2013 | Jewess | F02C 3/05 60/226.1 |
| 9,528,706 | B2* | 12/2016 | Montgomery | F23R 3/46 |
| 2004/0118102 | A1* | 6/2004 | Child | F01D 15/10 60/39.511 |
| 2010/0037623 | A1* | 2/2010 | Jewess | F02C 3/05 60/770 |
| 2012/0324903 | A1* | 12/2012 | Dewis | F02C 7/143 60/772 |
| 2014/0265335 | A1* | 9/2014 | Andreis | B63B 1/32 290/52 |
| 2015/0167986 | A1* | 6/2015 | Montgomery | F23R 3/46 60/726 |

* cited by examiner

*Primary Examiner* — Ehud Gartenberg
*Assistant Examiner* — Jacek Lisowski
(74) *Attorney, Agent, or Firm* — WPAT, PC (57) ABSTRACT

A micro turbine generator includes a compressor, a guide channel, an expansion chamber, and a recuperator. The expansion chamber includes an air inlet, an air outlet, and a guide vane structure. The air inlet is disposed at one end of the expansion chamber, connected with the compressor through the guide channel, and receives an air compressed by the compressor. The air outlet is disposed at the other end of the expansion chamber, connected with the recuperator, and discharges the air, allowing the air to enter the recuperator. The guide vane structure extends inward from an inner wall of the expansion chamber to allow the air to pass the guide vane structure before being discharged from the air outlet to enter the recuperator.

11 Claims, 9 Drawing Sheets

MICRO TURBINE GENERATOR WITH GUIDE VANE STRUCTURE

FIELD OF THE INVENTION

The present invention relates to micro turbine generators and, more particularly, to a micro turbine generator with a guide vane structure.

BACKGROUND OF THE INVENTION

A micro turbine generator is a device which generates power with a generator driven by an air turbine and is in wide use with aircraft, vehicles, and the like. A conventional micro turbine usually has a compressor, a combustor, a turbine, and a recuperator. The compressor compressed an air. Then, the compressed air is introduced into the expansion chamber through the guide channel. The expansion chamber reduces the velocity of the compressed air but enhances the uniformity of the compressed air, so as to prevent the compressed air from having an overly high velocity, or being not uniform, while entering the recuperator to reduce the efficiency of heat exchange in the recuperator and the micro turbine thermal efficiency.

However, the expansion chamber of a conventional micro turbine generator has at least one of the four problems as follows: First, the expansion chamber is too long or too wide; it is because the conventional expansion chamber requires that the diffusion angle of the compressed air in the expansion chamber should not exceed 7 degrees; to restrict the diffusion angle of the compressed air, it is necessary to increase the length or width of the expansion chamber and thus render the expansion chamber bulky. Second, the compressed air experiences overly large pressure loss; the diffusion of the compressed air in the expansion chamber is inevitably accompanied by pressure loss; if pressure loss is overly large, the efficiency of heat exchange in the recuperator will decrease, thereby also decreased the air turbine thermal efficiency. Third, the compressed air has high velocity at the recuperator inlet. Fourth, the compressed air has low uniformity.

Hence, in the field of designing an expansion chamber of a micro turbine generator, to meet requirements of applicable apparatuses, considerations must be given to four design requirements, namely volume of the expansion chamber, pressure loss of the compressed air, velocity of the compressed air, and uniformity of the compressed air. However, application of conventional micro turbine generators to specific apparatuses still can be sophisticated.

SUMMARY OF THE INVENTION

It is an objective of the present invention to provide a micro turbine generator with an expansion chamber which is advantageously compact and features small pressure loss of the compressed air, reasonably reduced the velocity of the compressed air, and high uniformity of the compressed air, thereby allowing the micro turbine generator to be suitable for use with plenty apparatuses.

Another objective of the present invention is to provide a micro turbine generator with an expansion chamber which is structurally simple to be easy to produce and incur low costs.

In order to achieve the above and other objectives, the present invention provides a micro turbine generator with a guide vane structure. The micro turbine generator comprises a compressor, a guide channel, an expansion chamber, and a recuperator. The expansion chamber comprises an air inlet, an air outlet, and a guide vane structure.

The air inlet is disposed at an end of the expansion chamber to communicate with the compressor through the guide channel and receive a air compressed by the compressor. The air outlet is disposed at another end of the expansion chamber to communicate with the recuperator and discharge the air, allowing the air to enter the recuperator. The guide vane structure extends inward from an inner wall of the expansion chamber to allow the air to pass the guide vane structure before being discharged from the air outlet to enter the recuperator.

Regarding the micro turbine generator in an embodiment of the present invention, an included angle is defined between a central extension line of the air inlet and a central extension line of the air outlet.

Regarding the micro turbine generator in an embodiment of the present invention, a central extension line of the air inlet does not overlap a central extension line of the air outlet.

Regarding the micro turbine generator in an embodiment of the present invention, the guide vane structure divides the expansion chamber into a plurality of reverse flow regions.

Regarding the micro turbine generator in an embodiment of the present invention, the expansion chamber comprises a first reverse flow wall and a second reverse flow wall. The first reverse flow wall is connected between a side of the air inlet and a side of the air outlet. The second reverse flow wall is connected between another side of the air inlet and another side of the air outlet. The guide vane structure is a guide vane. The first reverse flow wall and the guide vane define a first reverse flow region. The second reverse flow wall and the guide vane define a second reverse flow region. The air passes the air inlet, the first reverse flow region, the second reverse flow region, and the air outlet in sequence.

Regarding the micro turbine generator in an embodiment of the present invention, the guide vane has a fixed segment and an extended segment. The fixed segment is fixed to an inner wall of the first reverse flow wall. The extended segment is connected to the fixed segment and extended toward the inside of the expansion chamber.

Regarding the micro turbine generator in an embodiment of the present invention, one of wall surfaces of the second reverse flow wall is connected to another side of the air outlet, disposed on an extension line of another side of the air outlet, and spaced apart from the first reverse flow wall by a distance larger than any other wall surfaces of the second reverse flow wall.

Regarding the micro turbine generator in an embodiment of the present invention, a diffusion angle of the air in the second reverse flow region of the expansion chamber is larger than 7 degrees.

Regarding the micro turbine generator in an embodiment of the present invention, the guide vane element looks like a low-drag wing shape.

Regarding the micro turbine generator in an embodiment of the present invention, the air circulates in the guide channel faster than flows from the air outlet of the expansion chamber into the recuperator.

Regarding the micro turbine generator in an embodiment of the present invention, a cross-sectional area of the air inlet is less than a cross-sectional area of the air outlet.

The micro turbine generator in an embodiment of the present invention further comprises a combustion chamber and a turbine. The air passes the compressor, the guide channel, the expansion chamber, the recuperator, the combustion chamber, and the turbine in sequence. After being compressed by the compressor and discharged, the air undergoes heat exchange in the recuperator with another air discharged from the turbine.

The micro turbine generator in an embodiment of the present invention further comprises a plurality of guide plates disposed at the air outlet and an inlet of the recuperator.

Regarding the micro turbine generator in an embodiment of the present invention, the guide plates are parallel.

Regarding the micro turbine generator in an embodiment of the present invention, a direction in which the air inlet opens is parallel to a widthwise direction of the expansion chamber, and a direction in which the air outlet opens is parallel to a lengthwise direction of the expansion chamber.

Regarding the micro turbine generator in an embodiment of the present invention, a width of the expansion chamber equals three times a length of the expansion chamber.

Regarding the micro turbine generator in an embodiment of the present invention, a cross-sectional area of the air inlet of the expansion chamber equals two to five times a cross-sectional area of the guide channel.

Therefore, due to the guide vane structure, the expansion chamber of the micro turbine generator of the present invention is advantageously compact and features small pressure loss of the compressed air, reasonably reduced the velocity of the compressed air, and high uniformity of the compressed air.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
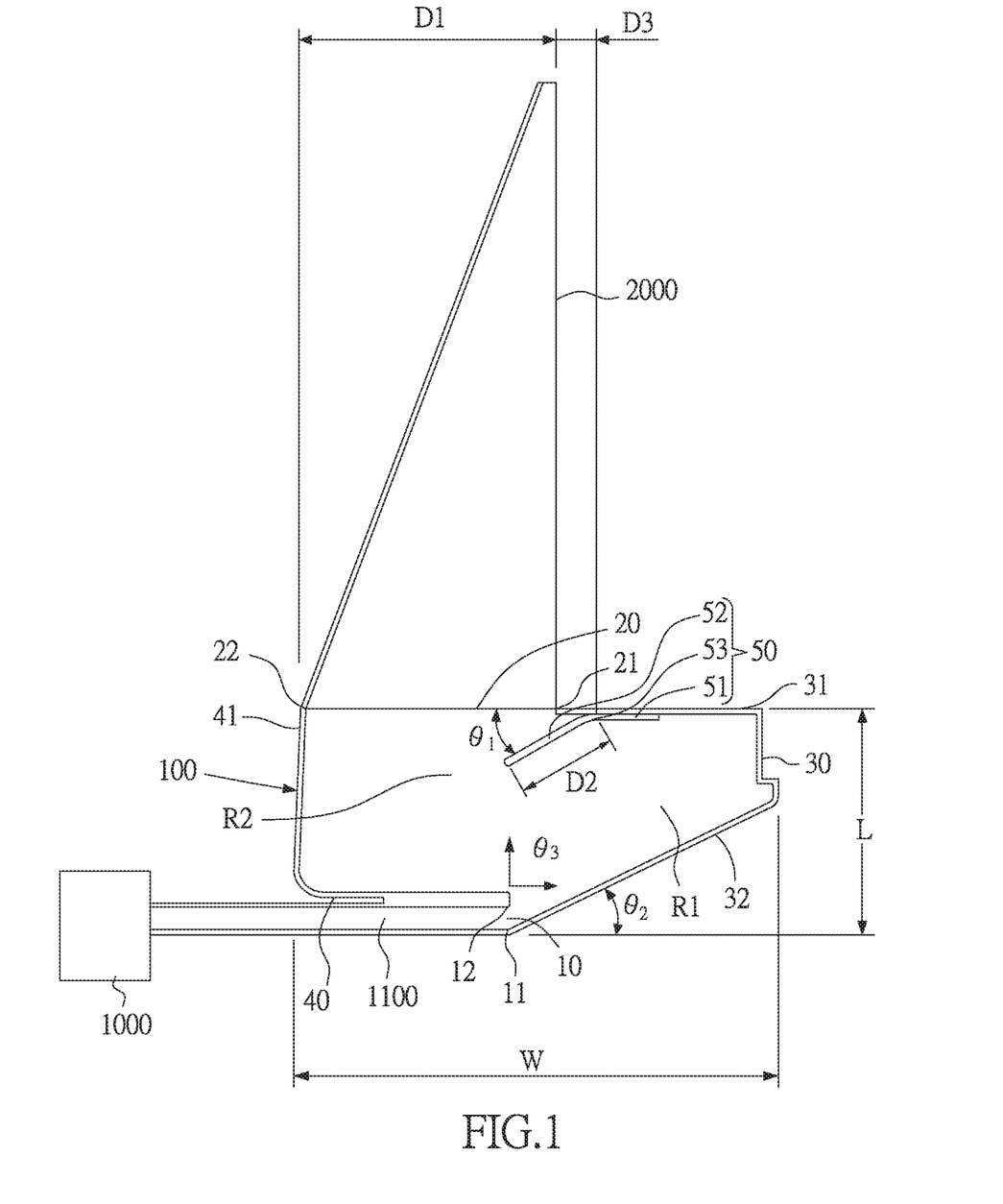
FIG. 1 is a schematic view of an expansion chamber of a micro turbine generator according to the first embodiment of the present invention.

Referring to FIG. 1, it is a schematic view of an expansion chamber 100 of a micro turbine generator according to the first embodiment of the present invention. The micro turbine generator comprises a compressor 1000, a guide channel 1100, the expansion chamber 100, and a recuperator 2000. Referring to FIG. 1, the expansion chamber 100 comprises a air inlet 10, a air outlet 20, and a guide vane structure 50. The guide vane structure 50 extends inward from an inner wall of the expansion chamber 100 to allow the air to pass the guide vane structure 50 before being discharged from the air outlet 20 to enter the recuperator 2000.

The expansion chamber 100 further comprises a first reverse flow wall 30 and a second reverse flow wall 40. If neither the air inlet 10 nor the air outlet 20 is opened, the air inlet 10, the first reverse flow wall 30, the air outlet 20, and the second reverse flow wall 40 together form a closed expansion chamber. Referring to FIG. 1, although the reverse flow walls in this embodiment are in the number of two, the present invention is not limited thereto. In a variant embodiment, the guide vane structure 50 divides the expansion chamber 100 into one or more reverse flow regions, and thus the quantity of the reverse flow walls is subject to changes. In this regard, "reverse flow" means that a fluid which flows in the region or across the wall surface changes its advancing direction by 180 degrees.

The air inlet 10 receives the air compressed by the compressor 1000. In this embodiment, the cross-sectional area of the air inlet 10 of the expansion chamber 100 equals the cross-sectional area of the guide channel 1100, and the air circulates in the guide channel 1100 faster than flows from the air outlet of the expansion chamber 100 into the recuperator 2000.

The air outlet 20 discharges the air and allows the air to enter the recuperator 2000 through an inlet thereof. In this embodiment, the direction in which the air inlet 10 opens does not cross the direction in which the air outlet 20 opens; hence, the air inlet 10 does not face the air outlet 20 squarely, and thus it is impossible for the compressed air to go from the air inlet 10 to the air outlet 20 directly. The direction in which the air inlet 10 opens is substantially parallel to the direction of the width W of the expansion chamber. The direction in which the air outlet 20 opens is substantially parallel to the direction of the length L of the expansion chamber. The cross-sectional area of the air inlet 10 is less than the cross-sectional area of the air outlet 20.

In a feasible embodiment, the situations where the direction in which the air inlet 10 opens does not cross the direction in which the air outlet 20 opens include: (1) an included angle is defined between the central extension line of the air inlet 10 and the central extension line of the air outlet 20, and the included angle is around 90 degrees in this embodiment, but the included angle in any other feasible embodiment is variable, for example, 60 degrees; and (2) the central extension line of the air inlet 10 does not overlap the central extension line of the air outlet 20.

The first reverse flow wall 30 is connected between a side 11 of the air inlet 10 and a side 21 of the air outlet 20. The second reverse flow wall 40 is connected between another side 12 of the air inlet 10 and another side 22 of the air outlet 20. Although FIG. 1 provides a preferred embodiment of the shapes and positions of the first reverse flow wall 30 and the second reverse flow wall 40, respectively, the shapes of the first reverse flow wall 30 and the second reverse flow wall 40 are not limited thereto.

The first reverse flow wall 30 and the guide vane structure 50 define a first reverse flow region R1. The second reverse flow wall 40 and the guide vane structure 50 define a second reverse flow region R2. The air passes the air inlet 10, the first reverse flow region R1, the second reverse flow region R2, and the air outlet 20 in sequence. The guide vane structure 50 is a guide vane.

Although FIG. 1 provides a preferred embodiment of the shape, position and quantity of the guide vane structure 50, the shape, position and quantity of the guide vane structure 50 are not limited thereto. For example, the guide vane structure 50 is a guide vane which has one or more bends and thus is arcuate. For example, the guide vane structure 50 is disposed on an inner wall surface of the second reverse flow wall 40 and extends toward the inside of the expansion chamber 100. Moreover, the embodiment of the guide vane structure 50 is not restricted to a guide vane; instead, the guide vane structure 50 may also be a non-plate structure. If the guide vane structure 50 comprises a guide vane, then the guide vane is in the number of one or more.

In this embodiment, the direction in which the air inlet 10 opens never crosses, and may even be perpendicular to, the direction in which the air outlet 20 opens; hence, it is impossible for the compressed air to go from the air inlet 10 to the air outlet 20 directly. Furthermore, under the law of conservation of mass, with the air inlet 10 being of a much smaller cross-sectional area than the air outlet 20, the air slows down on its way toward a larger cross-sectional area of passage. Hence, this embodiment is effective in slowing down the compressed air. Moreover, in this embodiment, the guide vane structure 50 enables reverse flow regions to be provided inside the expansion chamber 100, so as to further reduce the velocity of the compressed air but enhance the uniformity of the compressed air.

In this embodiment, since the guide vane structure 50 enables reverse flow regions R1, R2 to be provided inside the expansion chamber 100, the compressed air in the expansion chamber 100 expands sequentially in directions as guided to therefore slow down gradually but increase in uniformity, and in consequence the compressed air not only incurs little pressure loss but also takes up no additional capacity of the expansion chamber 100. Furthermore, the expansion chamber 100 in this embodiment is structurally simple to be easy to produce and incur low costs.

In the embodiment illustrated by FIG. 1, the shape of the expansion chamber 100, the position and angle of the guide vane structure, and the width of the air inlet 10 are specially designed and thus markedly manifest the aforesaid advantages. However, persons skilled in the art understand that the shape of the expansion chamber, the position and angle of the guide vane structure, and the width of the air inlet are adjustable. Hence, persons skilled in the art may adjust, as needed or on purpose, the shape of the expansion chamber, the position and angle of the guide vane structure, and the width of the air inlet without departing from the claimed scope of the present invention. Therefore, the scope of the present invention is not restricted to the embodiment illustrated by FIG. 1.

If the guide vane structure 50 is a guide vane, then the guide vane has a fixed segment 51 and an extended segment 52. The fixed segment 51 is fixed to the inner wall of the first reverse flow wall 30. The extended segment 52 is connected to the fixed segment 51 and extended toward the inside of the expansion chamber 100. The fixed segment 51 of the guide vane is parallel to a wall surface 31 of the first reverse flow wall 30. The included angle $\theta_1$ between the extended segment 52 of the guide vane and the extension line of the wall surface 31 is preferably between 30 degrees and 60 degrees. The air outlet 20 is disposed on the extension line of the wall surface 31. Moreover, assuming that the width D1 of the air outlet 20 equals X, then the length D2 of the extended segment 52 of the guide vane ranges preferably from 0.35X to 0.55X. The guide vane has a turning point 53 between the fixed segment 51 and the extended segment 52. The distance D3 between the turning point 53 and a side 21 of the air outlet 20 preferably ranges from 0.2X to 0.3X.

Moreover, another wall surface 32 of the first reverse flow wall 30 is preferably an inclined surface. The included angle $\theta_2$ between the wall surface 32 and a side 11 of the air inlet 10 ranges from 0 degree to 90 degrees exclusive. The included angle $\theta_3$ between the direction in which the air inlet 10 opens and the direction of the length L of the expansion chamber 100 ranges from 0 degree to 90 degrees. If the included angles $\theta_2$, $\theta_3$ are equal, then the direction in which the air inlet 10 opens is parallel to the wall surface 32.

Assuming that the included angle $\theta_3$ equals 90 degrees and thus the direction in which the air inlet 10 opens is parallel to the direction in which the air outlet 20 opens, the guide vane may be disposed between the extension line of the direction in which the air inlet 10 opens and the extension line of the direction in which the air outlet 20 opens to prevent the air from going from the air inlet 10 to the air outlet 20 directly and straightly.

In another embodiment, the air outlet 20 has an area of 14451 mm$^2$, whereas the inlet of the recuperator has an area of 97016 mm$^2$. The area of the inlet of the recuperator is 6.7 times that of the air outlet 20; hence, under the law of conservation of mass, the velocity of the air at the air outlet 20 is 6.7 times less than that at the inlet of the recuperator. If the compressed air has a velocity of 37 m/s, and the expansion chamber incurs a pressure loss of 0.11%, with a diffusion angle of 4.29 degrees, the expansion chamber will need to have a length of just 146 mm, as opposed to a length of 671 mm required by a conventional expansion chamber under the aforesaid conditions. Therefore, the expansion chamber of the present invention is markedly compact.

Moreover, in the absence of any guide vane, only the air which is equal to the compressor channel in area can enter the recuperator; hence, given a 85% heat transfer area and a 2.5% total pressure loss of the recuperator, heat exchange efficiency decreases from 88% to 46.8%. Therefore, the guide vane 50 of the present invention has a marked advantage.

Figure 2:
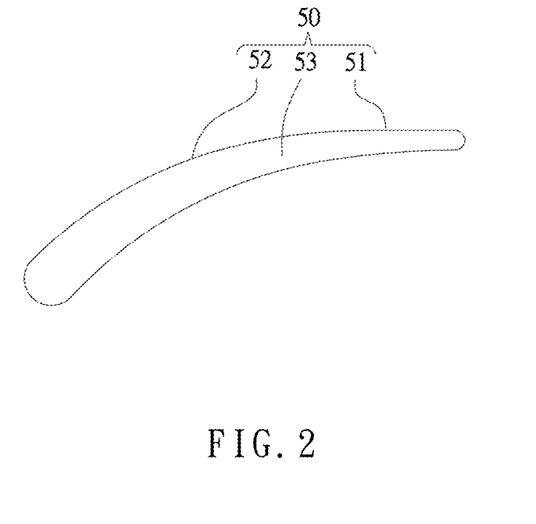
FIG. 2 is a schematic view of a guide vane structure of the micro turbine generator according to another embodiment of the present invention.

Referring to FIG. 2, the guide vane looks like a low-drag wing. In this embodiment, the guide vane is designed to be streamlined with a view to reducing windage, thereby reducing the pressure loss incurred by the compressed air in the course of reverse flow.

Figure 3:
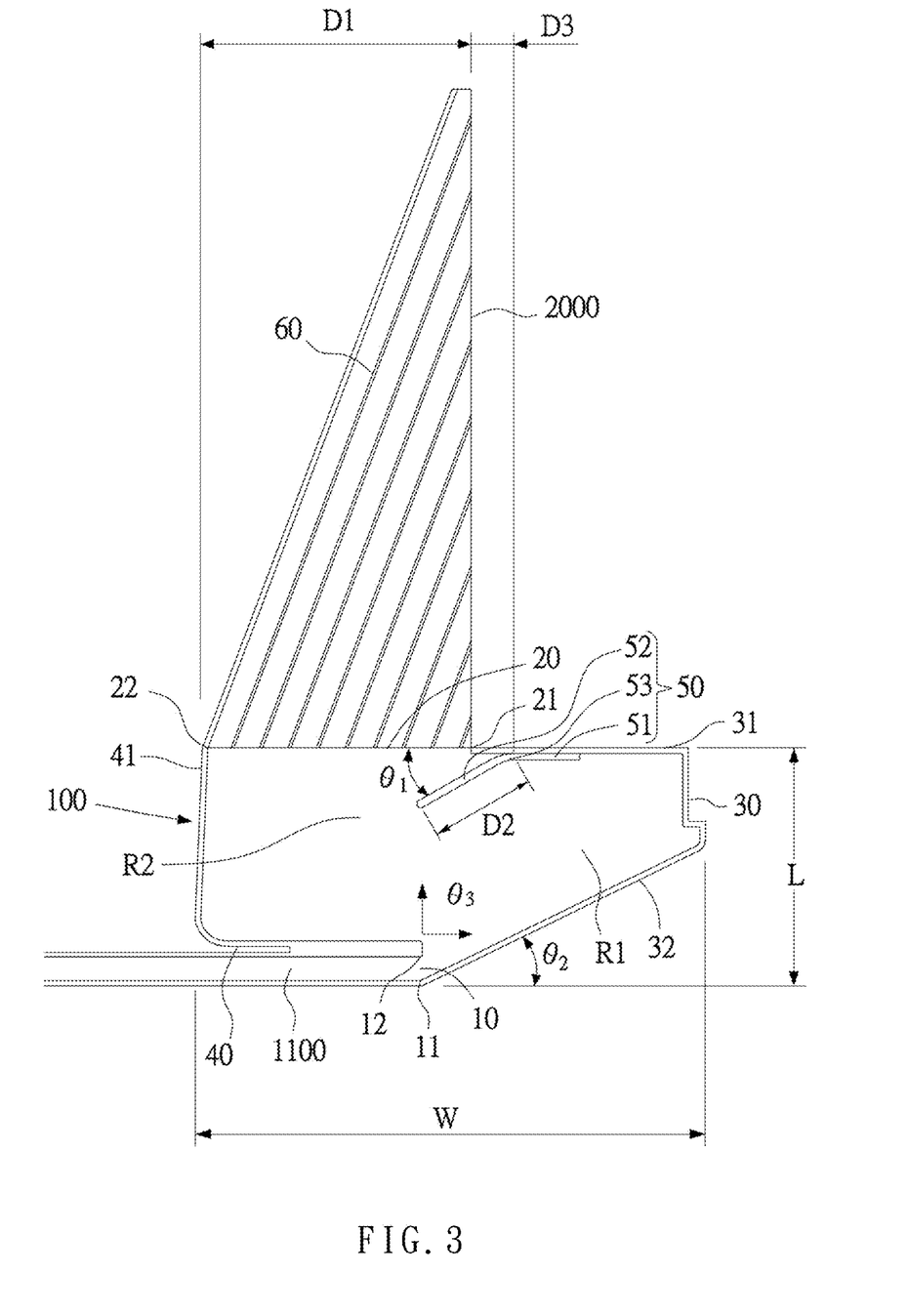
FIG. 3 is a schematic view of the expansion chamber of the micro turbine generator according to the second embodiment of the present invention.

Referring to FIG. 3, it is a schematic view of the micro turbine generator according to the second embodiment of the present invention. The components of the micro turbine generator in the second embodiment are substantially identical to the components of the micro turbine generator shown in FIG. 1, except for the technical features described below. The micro turbine generator in the second embodiment further comprises a plurality of guide plates 60 disposed at the air outlet 20 and the inlet of the recuperator 2000. The guide plates 60 are parallel so as to guide the air from the air outlet 20 to the recuperator 2000 uniformly and thus prevent the air from moving along the shortest route within the triangular region to compromise uniformity and incur pressure loss.

The inlet of the recuperator 2000 in this embodiment serves an illustrative purpose. In a variant embodiment, the inlet of the recuperator 2000 takes on any shapes (say a rectangle or a trapezoid) other than a triangle. Hence, the type of the recuperator and the shape of the inlet of the recuperator, as disclosed in the present invention, serve an illustrative rather than restrictive purpose.

Figure 4A:
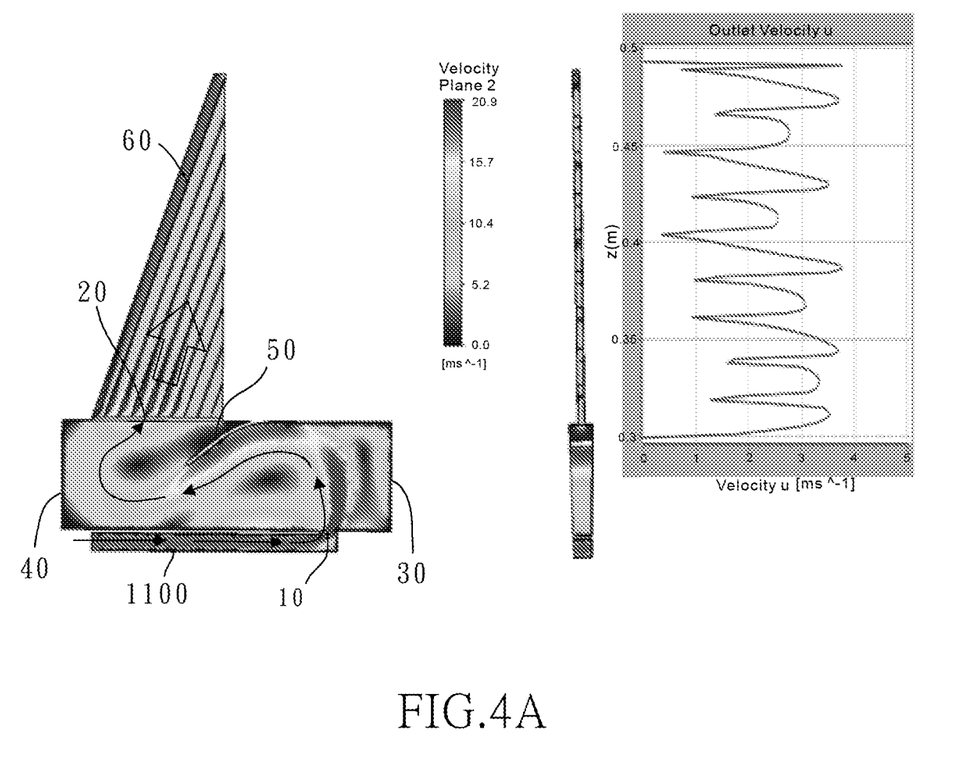
FIG. 4A through FIG. 4C are diagrams of comparing different cross-sectional areas of a air inlet of the expansion chamber of the present invention.
Figure 4B:
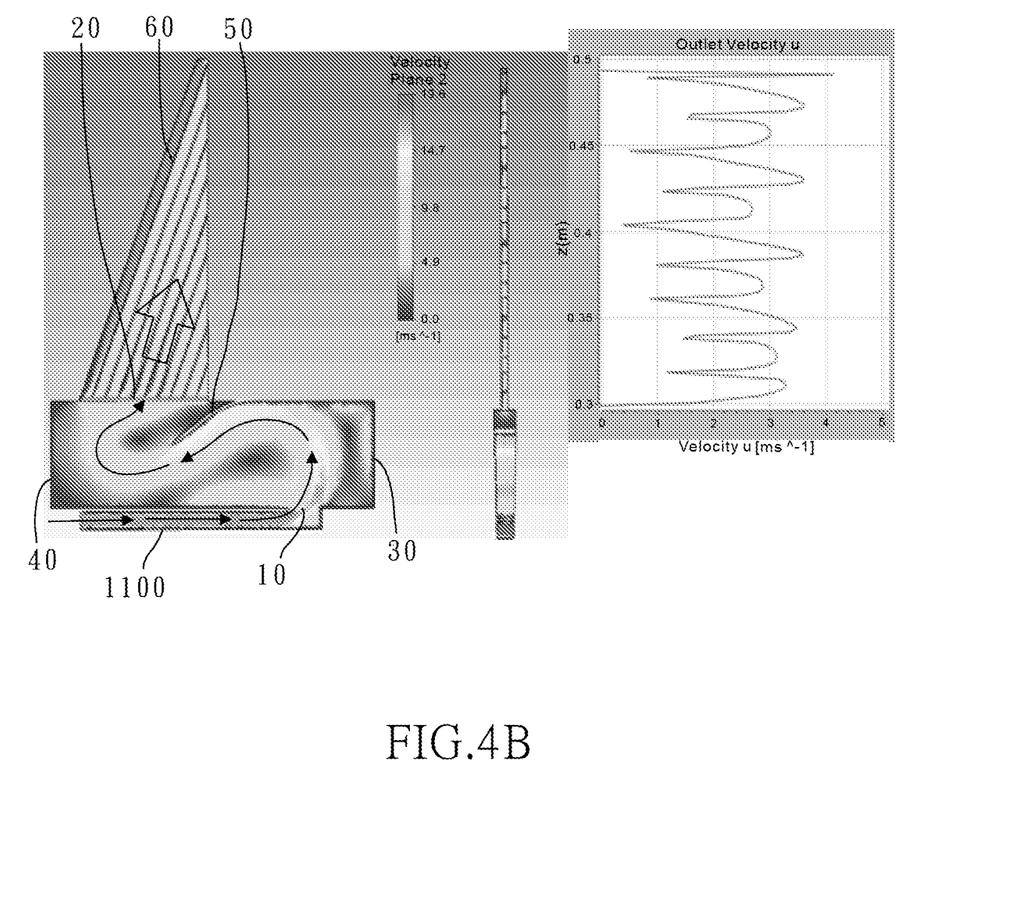
Figure 4C:
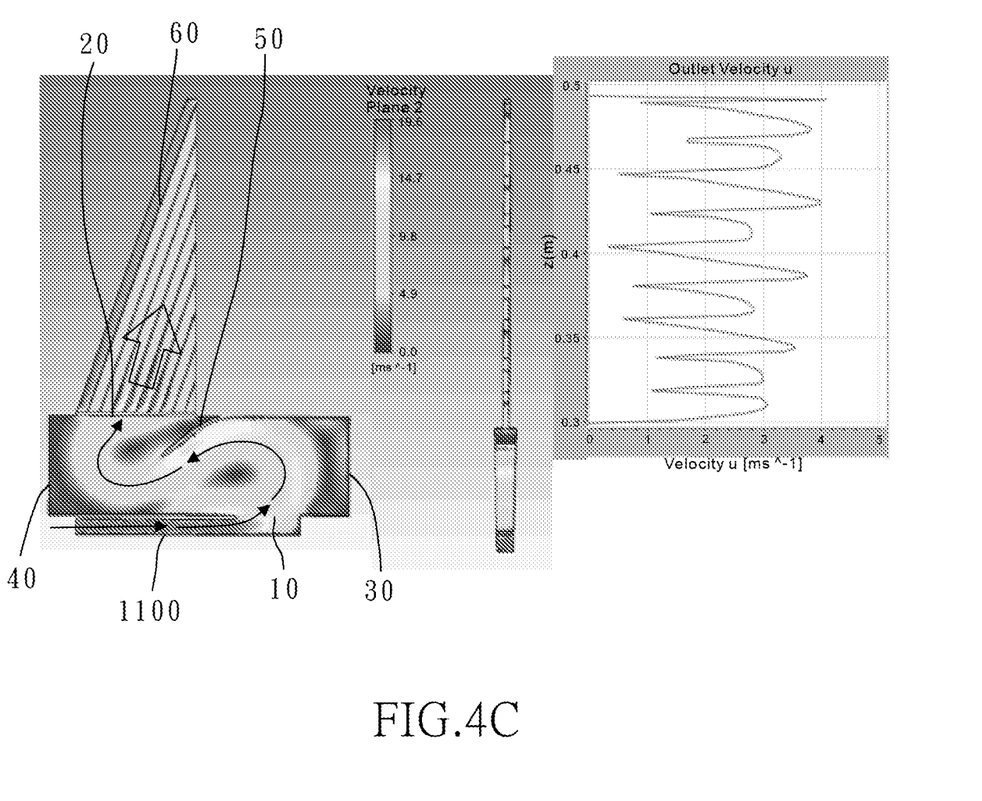

Referring to FIG. 4A through FIG. 4C, the present invention is further described below. As shown in FIG. 4A, the wall surface 32 is not an inclined surface, whereas the cross-sectional area of the air inlet 20 of the expansion chamber 100 equals the cross-sectional area of the guide channel 1100. As shown in FIG. 4B which serves a comparative purpose, the cross-sectional area of the air inlet 20 of the expansion chamber 100 is two times the cross-sectional area of the guide channel 1100. As shown in FIG. 4C which serves a comparative purpose, the cross-sectional area of the air inlet 20 of the expansion chamber 100 is four times the cross-sectional area of the guide channel 1100.

A comparison between FIG. 4A, FIG. 4B, and FIG. 4C shows that the best uniformity is demonstrated in FIG. 4B. For example, when the cross-sectional area of the air inlet 20 of the expansion chamber 100 is designed to be two to five times the cross-sectional area of the guide channel 1100, the compressed air has satisfactory uniformity. When the cross-sectional area of the air inlet 20 of the expansion chamber 100 is designed to be two times the cross-sectional area of the guide channel 1100, the compressed air has the best uniformity.

Figure 5A:
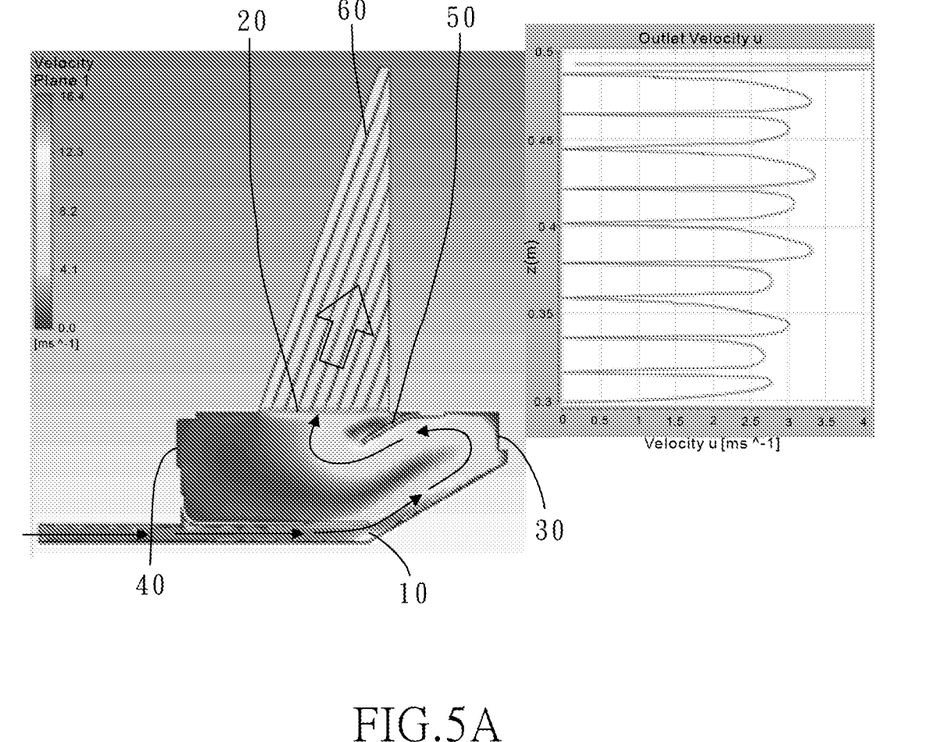
FIG. 5A through FIG. 5C are diagrams of comparing different shapes of a second reverse flow wall of the expansion chamber of the present invention.
Figure 5B:
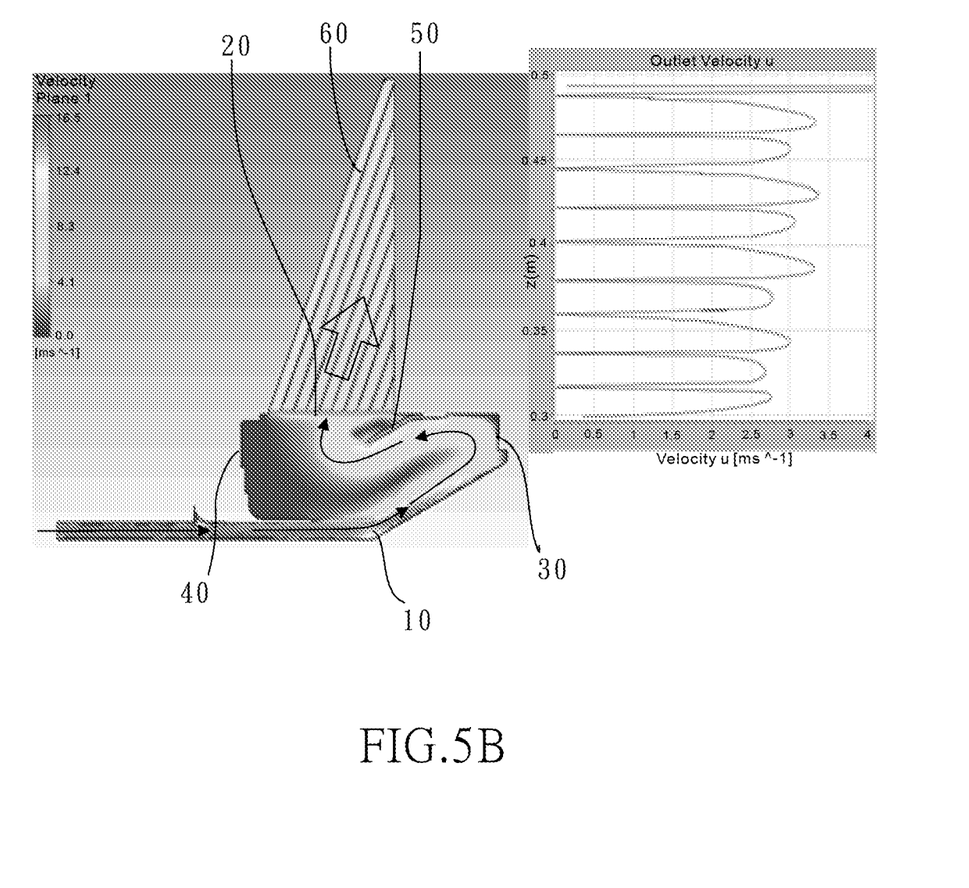
Figure 5C:
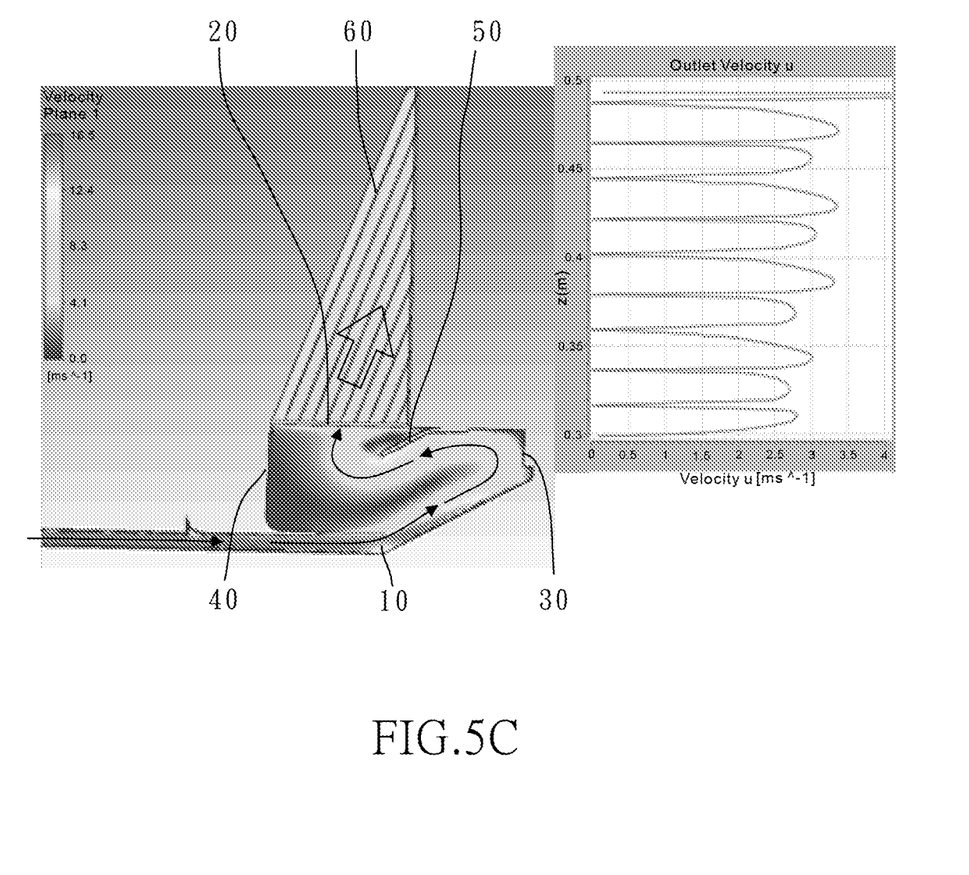

Referring to FIG. 5A through FIG. 5C, the wall surface 32 is an inclined surface. Referring to FIG. 5C, a wall surface 41 of the second reverse flow wall 40 is connected to the side 22 of the air outlet 20, whereas the wall surface 41 is disposed on the extension line of the side 22 of the air outlet 20, so that the wall surface 41 is spaced apart from the first reverse flow wall 30 by a distance larger than any other wall surfaces of the second reverse flow wall 40.

A comparison between FIG. 5A, FIG. 5B, and FIG. 5C reveals no difference in uniformity between FIG. 5A, FIG. 5B, and FIG. 5C, but shows that the expansion chamber in FIG. 5C has the least volume. Hence, the length of the second reverse flow wall 40 is preferably reduced to that shown in FIG. 5C.

In conclusion, the expansion chamber of the micro turbine generator of the present invention is equipped with the guide vane structure and thus is advantageously compact and features small pressure loss of the compressed air, reasonably reduced the velocity of the compressed air, and high uniformity of the compressed air.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A micro turbine generator with a guide vane structure comprising:
    a compressor;
    a guide channel;
    an expansion chamber; and
    a recuperator;
    wherein the expansion chamber comprises:
        an air inlet disposed at an end of the expansion chamber to communicate with the compressor through the guide channel and receive an air compressed by the compressor;
        an air outlet disposed at another end of the expansion chamber to communicate with the recuperator and discharge the air into the recuperator, and
        the guide vane structure extending inward from an inner wall of the expansion chamber to allow the air to pass the guide vane structure before being discharged from the air outlet to enter the recuperator;
    wherein the air inlet and the air outlet are disposed to face in different directions, a direction in which the air inlet opens is parallel to a direction of a width of the expansion chamber, and a direction in which the air outlet opens is parallel to a direction of a length of the expansion chamber, and the two directions are perpendicular;
    wherein the guide vane structure divides the expansion chamber into a plurality of reverse flow regions.

2. The micro turbine generator of claim 1, wherein an included angle is defined between a central extension line of the air inlet and a central extension line of the air outlet.

3. The micro turbine generator of claim 1, wherein a central extension line of the air inlet does not overlap a central extension line of the air outlet.

4. The micro turbine generator of claim 1, wherein
    the expansion chamber comprises a first reverse flow wall and a second reverse flow wall, with the first reverse flow wall connected between a side of the air inlet and a side of the air outlet, and the second reverse flow wall connected between another side of the air inlet and another side of the air outlet; and
    the guide vane structure being a guide vane, allowing the first reverse flow wall and the guide vane to define a first reverse flow region, allowing the second reverse flow wall and the guide vane to define a second reverse flow region, allowing the air to pass the air inlet, the first reverse flow region, the second reverse flow region, and the air outlet in sequence.

5. The micro turbine generator of claim 4, wherein the guide vane has a fixed segment and an extended segment, with the fixed segment fixed to an inner wall of the first reverse flow wall, and the extended segment connected to the fixed segment and extended toward an inside of the expansion chamber.

6. The micro turbine generator of claim 4, wherein one of wall surfaces of the second reverse flow wall is connected to another side of the air outlet, disposed on an extension line of said another side of the air outlet, and spaced apart from the first reverse flow wall by a distance larger than any other wall surfaces of the second reverse flow wall.

7. The micro turbine generator of claim 1, wherein the air circulates in the guide channel faster than flows from the air outlet of the expansion chamber into the recuperator.

8. The micro turbine generator of claim 1, wherein a cross-sectional area of the air inlet is less than a cross-sectional area of the air outlet.

9. The micro turbine generator of claim 1, further comprising a plurality of guide plates disposed at the air outlet disposed at said another end of the expansion chamber and an inlet of the recuperator.

10. The micro turbine generator of claim 9, wherein the plurality of guide plates are parallel.

11. The micro turbine generator of claim 1, wherein the width of the expansion chamber equals three times the length of the expansion chamber.

* * * * *